Patented Oct. 8, 1929

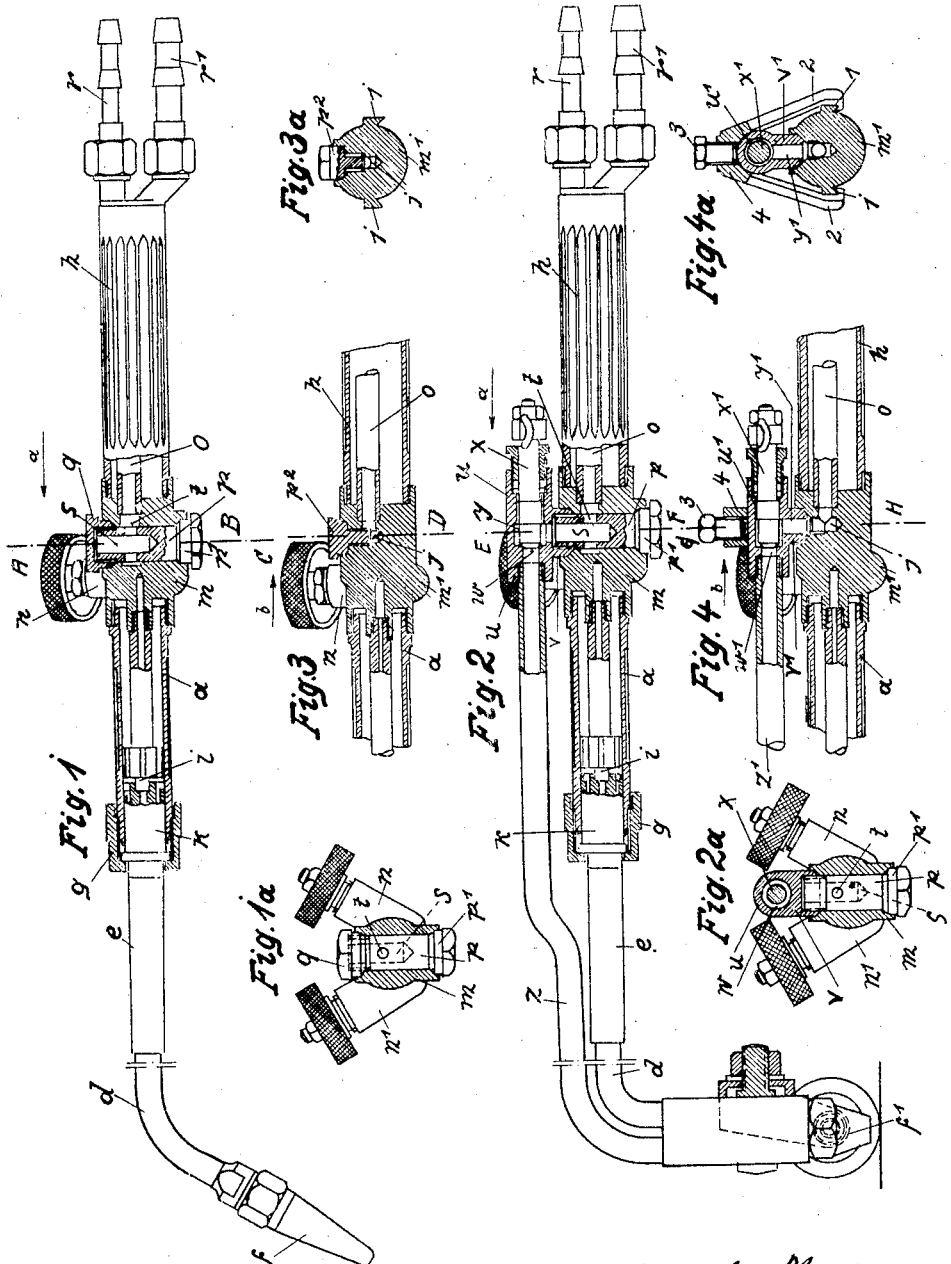
Oct. 8, 1929.  A. MESSER  1,731,020
BURNER FOR CUTTING AND WELDING
Filed March 11, 1927

1,731,020

UNITED STATES PATENT OFFICE

ADOLF MESSER, OF FRANKFORT-ON-THE-MAIN, GERMANY

BURNER FOR CUTTING AND WELDING

Application filed March 11, 1927, Serial No. 174,463, and in Germany March 4, 1926.

There is an increasing demand for a single type of tool or torch which may be used for either welding or cutting. The difficulty which has been encountered is in the arrangement of the conduit for the cutting oxygen so that it may be readily removed when the tool is to be used for welding and so that when said conduit is applied for cutting purposes it does not interfere with the convenient gripping or holding of the single tubular handle of the torch.

In my invention I overcome this difficulty in a very simple manner by providing the torch with a valve block at the forward end of the hand grip portion and providing said valve block with means whereby an oxygen conduit and its controlling valve may be detachably secured in place. The main block is also provided with means whereby the passage to the cutting oxygen conduit may be closed when said conduit is removed.

In the accompanying drawing I have illustrated two embodiments of my invention, the difference between the two forms relating primarily to the means employed for detachably securing the oxygen conduit to the main valve block.

In these drawings:

Fig. 1 is a side elevation partly in longitudinal section of a welding torch constructed in accordance with my invention, Fig. 1$^a$ is a transverse section on the line A—B viewed in the direction of the arrow $a$.

Figs. 2 and 2$^a$ are corresponding views of the same parts with the cutting oxygen conduit secured in place, Fig. 2$^a$ being a section on the line E—F.

Fig. 3 is a longitudinal section similar to a portion of Fig. 1, but showing a modified construction, Fig. 3$^a$ is a transverse section on the line C—D of Fig. 3 viewed in the direction of the arrow $b$, and Figs. 4 and 4$^a$ are views corresponding to Figs. 3 and 3$^a$, but showing the cutting oxygen conduit secured in place, Fig. 4$^a$ being a section on the line G—H of Fig. 4 viewed in the direction of the arrow $b$.

The torch illustrated has a tubular body portion $a$ to which the tip or mouth piece $f$ is connected by mixture conduit sections $e$ and $d$. Within the tube $a$ is an oxygen nozzle $i$ and a mixing nozzle $k$ whereby the gases are mixed in the proper proportions and delivered to the conduit $e$. The conduit $e$ is secured in place in any suitable manner as for instance by a cap nut $g$.

At the rear end of the torch is a tubular handle $h$ and this is connected to the body portion $a$ by a valve block $m$ within which are two regulating valves $n$ and $n^1$ for controlling the relative proportions of the two gases delivered to the mixing nozzle $k$. The two gases may be supplied to the rear end of the handle through tubes $r$ and $r^1$, one of which may deliver directly to the interior of the handle and the other, namely, the oxygen tube, may connect with a tube $o$ leading from the handle to the valve block $m$.

The details of construction of the parts above described form no portion of the present invention. These parts may be designed or constructed in any well known manner or in accordance with the design of any welding torch now on the market. It is only essential that the torch be of such type that the cutting oxygen conduit may be connected at a point beyond the hand grip portion.

My invention relates primarily to the means whereby the welding torch of this general construction may be readily converted into a cutting torch.

In the construction shown in Figs. 1 and 1$^a$ the valve block $m$ is provided with a vertical passage or bore within which is located a turning plug $p$. This may have a hexagonal head whereby it may be rotated and may have an annular portion $p^1$ seating in the bore and limiting the endwise movement of the turning plug in one direction. At the end opposite to the head, the plug is exteriorly threaded and is provided with a screw cap $q$ which fits into a counter bore in the valve block so that when the screw cap is applied and tightened, a tight seal is formed at the annular portion $p^1$ and at the inner end of the screw cap, and no oxygen can escape.

The turning plug $p$ has a longitudinal bore $s$ which opens at one end and is closed by the screw cap $q$. The plug also has radial passages connecting this bore with an annular channel $t$ in the valve block, which latter communicates with the oxygen supply pipe $o$ within the handle. When the torch is used for welding the screw cap $q$ is in place as shown in Figs. 1 and 1ᵃ.

For use in connection with this welding torch, I provide an auxiliary valve block $u$ which has an annular internally threaded flange $v$ similar in size and dimensions to the flange of the screw cap $q$, whereby the auxiliary valve block may be put in place of the screw cap. The auxiliary valve block $u$ has a passage $y$ adapted to register with the passage $s$ in the plug $p$ and it also has a passage $w$ adapted to communicate with a tube $z$ leading to the cutting tip or mouth piece $f^1$. Within the auxiliary valve block there is a valve $x$ for controlling the flow of oxygen through the auxiliary valve block to the tube $z$. When the device is to be used as a cutting torch the block $u$ with its oxygen valve and tube $z$ is substituted in place of the screw cap $q$ and the flow of oxygen for cutting purposes is controlled by the valve $x$. As the valve block $u$ cannot be rotated to screw it into place, the plug $p$ is made rotatable so that it screws into the auxiliary valve block, but by reason of the arrangement of passages therein, there may be a free flow of oxygen to the auxiliary valve block with the block in any position.

In Figs. 3, 3ᵃ and 4ᵃ, I have shown another construction which may be employed for carrying out my invention. In this case I do not employ any plug, such as $p$, but connect the auxiliary valve block by other means. The main valve block $m^1$ has a passage $j$ which communicates with the oxygen pipe $o$ and reaches to the upper side of the valve block. This is normally closed by a screw plug $p^2$. The auxiliary valve block $u^1$ is similar to the auxiliary valve block $u$ except that it has a tubular portion $v^1$ with a passage $y^1$ for seating in the valve block $m^1$, in place of the plug $p^2$. The valve $x$ controls the flow of the oxygen in the same manner from the passage $y^1$ to the passage $w^1$. For holding the auxiliary valve block in place, the main valve block is provided with a pair of shoulders 1 and the auxiliary valve block has a saddle 4 carrying a pair of arms 2 with hooked terminals in engagement beneath the shoulders. The saddle at its upper part has an adjusting screw 3 whereby the auxiliary valve block may be forced into gas tight engagement with the main valve block.

By means of my invention, the operator when using the torch for welding does not carry the additional weight of the cutting oxygen attachment, but he can easily and quickly apply the attachment whenever he desires to use the torch for cutting. It is only necessary to remove the closure $q$ or $p^2$ and secure the auxiliary valve block in place.

Having thus described my invention, what I claim as new and desire to secure by Letters Patent is:

1. A welding torch having a tubular handle, an oxygen tube extending therethrough, a member at the front end of said handle and provided with a transverse bore, a turning plug within said bore and having an auxiliary passage communicating with said oxygen tube, and a cutting oxygen conduit having a portion adapted to be detachably secured to the end of said plug.

2. A welding torch having a tubular handle, an oxygen tube extending therethrough, a member at the front end of said handle and provided with a transverse bore, a turning plug within said bore and having an auxiliary passage communicating with said oxygen tube, and a cutting oxygen conduit having a valve block and threaded connections between the end of said turning plug and said valve block.

3. A welding torch having a pair of valve blocks provided with interengaging seats for forming a gas-tight joint therebetween, said valve blocks having registering passages for cutting oxygen extending through said seats, one of said valve blocks having a pair of valves for controlling the gases for welding purposes, and the other being removable and having a valve for controlling the oxygen for cutting purposes, a threaded member adapted to be rotated independent of any relative movement of said valve blocks for effecting the clamping together of said seats, said threaded member being adapted to engage a closure for said passage in the first mentioned valve block when the second mentioned valve block is removed.

4. A welding torch having a pair of valve blocks provided with interengaging seats for forming a gas-tight joint therebetween, said valve blocks having registering passages for cutting oxygen extending through said seats, one of said valve blocks having a pair of valves for controlling the gases for welding purposes, and the other being removable and having a valve for controlling the oxygen for cutting purposes, a member projecting through the first mentioned valve block and having a threaded end for engaging the second mentioned valve block for effecting the clamping together of said seats, said threaded end being adapted to engage a closure for said passage in the first mentioned valve block when the second mentioned valve block is removed.

5. A welding torch including a tubular handle having an oxygen supply pipe therein, a valve block at the front end of said handle and provided with means for controlling the flow of gases for welding purposes, and said valve block also having a passage for cutting oxygen terminating in a chamber having a seat, a second valve block having a tubular portion projecting into said chamber and engaging with said seat, and having a passage registering with the first mentioned passage, and means separate from said valve blocks for clamping said valve blocks together in predetermined relative positions, and with said projection within said chamber and engaging said seat.

In testimony whereof I affix my signature.

ADOLF MESSER.